(12) United States Patent
Burik et al.

(10) Patent No.: US 8,618,190 B2
(45) Date of Patent: Dec. 31, 2013

(54) LATEX MARKING INKS

(75) Inventors: Heather E. Burik, Canton, OH (US); Steve White, Louisville, KY (US)

(73) Assignee: PolyOne Corporation, Avon Lake, OH (US)

( * ) Notice: Subject to any disclaimer, the term of this patent is extended or adjusted under 35 U.S.C. 154(b) by 61 days.

(21) Appl. No.: 13/020,577

(22) Filed: Feb. 3, 2011

(65) Prior Publication Data
US 2011/0189418 A1 Aug. 4, 2011

Related U.S. Application Data

(60) Provisional application No. 61/301,466, filed on Feb. 4, 2010.

(51) Int. Cl.
| | | |
|---|---|---|
| A63B 67/00 | (2006.01) |
| A63B 65/10 | (2006.01) |
| A63B 67/06 | (2006.01) |
| A63F 9/02 | (2006.01) |
| B32B 3/02 | (2006.01) |
| B32B 27/00 | (2006.01) |
| B32B 27/32 | (2006.01) |
| B32B 25/04 | (2006.01) |
| B32B 25/12 | (2006.01) |
| B32B 27/08 | (2006.01) |
| B32B 33/00 | (2006.01) |
| B60C 1/00 | (2006.01) |
| B60C 5/00 | (2006.01) |
| C04B 24/26 | (2006.01) |
| C08C 19/22 | (2006.01) |
| C08F 8/00 | (2006.01) |
| C08F 8/30 | (2006.01) |
| C08F 8/44 | (2006.01) |
| C08F 14/18 | (2006.01) |
| C08F 114/18 | (2006.01) |
| C08F 214/18 | (2006.01) |
| C08G 18/42 | (2006.01) |
| C08G 73/10 | (2006.01) |
| C08G 73/12 | (2006.01) |
| C08K 5/06 | (2006.01) |
| C08L 27/00 | (2006.01) |
| C09D 5/00 | (2006.01) |
| C09D 11/00 | (2006.01) |
| D03D 27/00 | (2006.01) |
| D04H 11/00 | (2006.01) |
| D05C 17/00 | (2006.01) |
| F16L 11/00 | (2006.01) |

(52) U.S. Cl.
USPC .......... 523/160; 523/161; 524/369; 524/375; 524/552; 525/326.3; 525/378; 152/151; 152/450; 473/588; 463/49; D21/318; 428/85; 428/95; 428/96; 428/492; 428/493; 428/500; 428/515; 428/521; 138/137

(58) Field of Classification Search
USPC ................. 523/160, 161; 524/369, 375, 552; 525/326.3, 378; 138/137; 463/49; 473/588; D21/318; 152/151, 450; 428/85, 95, 96, 492, 493, 500, 515, 428/521
See application file for complete search history.

(56) References Cited

U.S. PATENT DOCUMENTS

| | | | | |
|---|---|---|---|---|
| 2,702,285 A | * | 2/1955 | Bebb et al. | 524/158 |
| 3,503,917 A | * | 3/1970 | Burke, Jr. | 523/328 |
| 4,329,265 A | * | 5/1982 | Hallenbeck | 524/496 |
| 4,418,183 A | * | 11/1983 | Chiang | 526/80 |
| 2005/0250891 A1 | * | 11/2005 | Matuki | 524/430 |

OTHER PUBLICATIONS

"Tire and Rubber Manufacturing—The Water-Based Series" APV Engineered Coatings (2009).
"JAM-6970 White Water Removable" Tire Marking Inks, Matthews Marking Products (2007).
"Tire Technology Expo 2010" Presentation Title: "Green and friendly: water-based inks for tire marking" (2010).
Letter Regarding White Spray Latex Samples, Feb. 25, 2009.

* cited by examiner

*Primary Examiner* — Patrick Niland
(74) *Attorney, Agent, or Firm* — John H. Hornickel

(57) ABSTRACT

A latex marking ink suitable for marking rubber articles has been developed. The ink comprises vulcanizable rubber latex, pigment, vulcanizing agent, and non-ionic stabilizer dispersed in water. Shear stability is dramatically and unexpectedly increased by the presence of the non-ionic stabilizer even though viscosity also increases.

14 Claims, No Drawings

LATEX MARKING INKS

CLAIM OF PRIORITY

This application claims priority from U.S. Provisional Patent Application Ser. No. 61/301,466 bearing and filed on Feb. 4, 2010, which is incorporated by reference.

FIELD OF THE INVENTION

This invention relates to inks for marking of rubber products.

BACKGROUND OF THE INVENTION

All industrial products need identification during manufacture and after for purposes of inventory control, working capital management, and quality tracing.

Marking technology for rubber products, such as tires, have previously used solvent-based marking liquids. Volatile organic chemicals serving as solvents for marking liquids have more environmental complications than aqueous-based marking liquids.

United States Patent Application Publication No. 2005/0250891 (Matuki), now abandoned, discloses a water-based coating material for a rubber product employing an ecologically friendly rubber-based vulcanizable latex and pigment.

SUMMARY OF THE INVENTION

The art needs a stabilized water-based marking ink for rubber products.

The present invention provides a latex marking ink for rubber products, which contains a non-ionic stabilizer to improve shear stability.

One aspect of the present invention is a latex marking ink, comprising: (a) vulcanizable rubber; (b) pigment; (c) water; (d) a vulcanizing agent; and (e) octyl phenol ethoxylate in an amount from about 0.1 to about 5 weight percent of the ink, wherein shear stability of the ink is greater than three times shear stability of the ink without the octyl phenol ethoxylate.

An advantage of the invention is the unexpectedly and dramatically longer shear stability because of the presence of the non-ionic stabilizer. The shear stability of inks of the present invention exceeds 60 minutes (ASTM D1076 60 grams, 5.5 set point (3600 rpm, Cowles blade), more than three times the same formulation of ink without the non-ionic stabilizer. This duration of shear stability is important because coagulation of the water-based marking ink too early or too easily can clog the ink dispensing equipment. This tripling of shear stability occurs even though viscosity also increases by a factor of three. Fortunately, the increased viscosity remains within the range tolerated by conventional ink dispensing equipment.

EMBODIMENTS OF THE INVENTION

Ink Ingredients

Latex

Essential for a water-based ink of the present invention is a latex of vulcanizable rubber particles. Non-limiting examples of vulcanizable rubbers include natural rubber (NR), butadiene rubber (BR), chloroprene rubber (CR), acrylonitrile-butadiene rubber (NBR), isoprene rubber (IR), styrene-butadiene rubber (SBR), modified styrene-butadiene rubber, carboxy-modified styrene-butadiene rubber (c-SBR), butyl rubber (IIR), and acrylonitrile-styrene-butadiene rubber (NSBR). Those types of rubber may be used alone or in combination. The type of rubber latex may be used in combination with a water-based resin. The type of rubber latex can be prepared by a known process, for example, an emulsion polymerization process.

Of the various types of vulcanizable rubber, high ammonia natural rubber is preferred.

Pigment

For marking rubber products, most often dark or black in color, pigments of lighter shades are used. Conversely, white or light-colored rubbers products need a contrasting dark or black colored pigment.

Any inorganic pigment or organic pigment providing contrast to the rubber substrate is a candidate for use in this invention, so long as it is compatible with the latex. The pigments may be used alone or in combination. Non-limiting examples of white pigments are zinc white and titanium oxide. Non-limiting examples of black pigments are lamp black or carbon black. Other useful pigments include inorganic pigments, such as zinc oxide, zinc phosphate, iron oxide, and chromium oxide; and organic pigments, such as phthalocyanine.

Vulcanizing Agent

The vulcanizable rubber latex needs a vulcanizing agent in order to cure the ink on the rubber substrate as a support for the pigment. Any vulcanizing agent for curing a commercial latex is suitable for consideration as useful in the present invention. Non-limiting examples of vulcanizing agents include sulfur, selenium, tellurium, a compound containing one or more of those elements, an aromatic nitro compound, and a peroxide, or combinations thereof.

Non-Ionic Stabilizer

The non-ionic stabilizer for use in the present invention is a non-ionic surfactant which makes the marking ink useful for marking rubber products. The increase in viscosity and longer shear stability provided by the presence of the non-ionic surfactant makes the latex marking inks commercially useful for marking rubber tires, for example. Non-ionic surfactants are commercially available from a number of sources. Of them, octyl phenol ethoxylate is especially preferred and is commercially available as Triton X-405 latex non-ionic surfactant from Union Carbide, now a part of Dow Chemical Company.

Water

For the latex, pigment, non-ionic stabilizer, and vulcanizing agent, water is used as the continuous phase into which the other ingredients are dispersed, for delivery of the ink from its reservoir to the rubber substrate. Deionized water is preferred.

Other Additives

Optional but desirable other additives for the latex marking inks of the present invention include antimicrobials, thickeners, anionic surfactants, amphoteric surfactants, dispersants, antioxidants, neutralizing agents, odorants, activators, and other conventional ingredients in minor amounts which are used in latex dispersions, pigments, etc.

Table 1 shows acceptable, desirable, and preferred ranges of the ingredients of the inks.

TABLE 1

| Ingredients | | | |
|---|---|---|---|
| Ingredient (Wt. %) | Acceptable | Desirable | Preferred |
| Vulcanizable rubber latex | 55-75 | 60-70 | 60-64 |
| Pigment | 10-20 | 12-20 | 15-18 |
| Vulcanizing Agent | 0.2-4.0 | 0.4-1.5 | 0.5-1 |

TABLE 1-continued

| Ingredient (Wt. %) | Acceptable | Desirable | Preferred |
|---|---|---|---|
| Non-Ionic Stabilizer (octyl phenol ethoxylate) | 0.1-5 | 0.1-4 | 1-3 |
| Water | 5-25 | 10-20 | 13-16 |
| Optional Ingredients | 0-10 | 0-7 | 1-5 |

Preparation

Dispersion of the ingredients into the water is not complicated. The various ingredients are added in no particular order to a pneumatic mixer after the vulcanizable rubber latex is added. The mixing temperature is ambient, and the speed of mixing is low shear until all ingredients are well dispersed to form a viscous liquid. Alternatively, one can group various ingredients into dispersion masterbatches for convenience of final mixing. For example, if different colorants are used, one can have a variety of colorant masterbatches available to choose from to mix with a latex masterbatch and the non-ionic stabilizer.

Usefulness of the Invention

The latex marking ink can be applied to the rubber substrate in any conventional manner. Painting, spraying, and printing using dot matrix, spray-jet, and inkjet printers are all possible means of delivering the ink from its reservoir to the surface of the rubber article, provided that the print head can accommodate an ink having the viscosities such as those identified in Examples 1 and 2 below. A person having skill in the art can determine the appropriate delivery means by considering such factors as particle size of solids in the latex ink, viscosity of the latex ink, temperature of the delivery mechanism, distance from the delivery mechanism to the rubber substrate, etc.

Desirably, the printer can be a conveyor line code printer, a wheel code printer, a dot and stripe printer, or a spray marker printer.

Preferably, the printer can be an ink jet printer which can be configured to print using co-curable inks on vulcanizable rubber products.

With more than one delivery mechanism in parallel or in series, one can deliver more than one color of latex ink to the rubber substrate, permitting multi-colored information, images, or graphics to be added to the surface of the rubber substrate.

Water as the continuous phase must be removed from the ink after delivery to the rubber substrate. Also the vulcanizable rubber needs to be cured by the vulcanizing agent to immobilize the associated pigment to remain in position of its delivery as a graphic, number, letter, or other desired indicium. Temperatures of between about 150° C. and about 170° C. for a duration of from about 8 to about 15 minutes can be used to evaporate the water and crosslink the latex rubber. This temperature and duration can be the same as when an unvulcanized rubber substrate becomes vulcanized or can be at a later time, so long as the underlying rubber substrate is not adversely affected by the second heating event.

Non-limiting examples of the rubber articles which can benefit from the invention are vehicle tires, gaskets, seals, hockey pucks, hoses, carpet backings and other industrial or consumer items of vulcanized rubber.

Further embodiments of the invention are described in the following Examples.

EXAMPLES

Tables 2 and 3 show the identity and formulations of the specific ingredients of Comparative Example A and Examples 1 and 2. Each formulation was prepared by mixing a pigment masterbatch and the non-ionic stabilizer into latex dispersion masterbatch in a pneumatic mixer operating at ambient mixing temperature and set to a speed of low shear. Mixing continued until all ingredients were well dispersed to form a viscous liquid.

Table 4 shows the test results for three different samples of Example A, prepared at different times, two different samples of Example 1, prepared at different times, and one sample of Example 2.

TABLE 2

| Ingredient Name | Purpose | Brand Name | Generic Name | Commercial Source |
|---|---|---|---|---|
| LATEX, HA NATURAL | Rubber Binder | Unitex HA | Natural Rubber Latex, High Ammonia | Unitex |
| TI-PURE R-960-07 | Pigment | Ti-Pure | Titanium Dioxide | DuPont |
| DE-IONIZED WATER | Continuous Phase | | Water | In-House |
| TRITON X-405 UNION CARBIDE | Latex Non-Ionic Surfactant | Triton X-405 | Octyl Phenol Ethoxylate | Dow |
| TRITON X-100 SURFACTANT | Non-Ionic Wetting Agent | Triton X-100 | Octyl Phenol Ethoxylate | Dow |
| HAR #11 R CASEIN POWDER | Colloid Stabilizer/Thickener | Har #11 R | Phosphoprotein | Harwick Standard |
| CAUSTIC POTASH-KOH FARLEY CHEM | Liquid Phase Stabilizer | Caustic Potash KOH | Potassium Hydroxide | Occidental |
| N-521 BIOCIDE | Antimicrobial | N-521 | Tetrahydro-3,5-dimethyl-2H,3,5-thiadiazine-2-thione | VeriChem |
| VANCIDE MZ-96 POWDER | Antimicrobial | Vancide MZ-96 | Zinc Dimethyl Dithiocarbamate | RT Vanderbilt |
| GUM ARABIC G-150 POWDER | Colloid Stabilizer/Thickener | Gum Arabic G-150 | Ca, Mg, and K salts of arabic acid | Frutarom Inc. |
| OLEIC ACID CA 1334 | Activator | CA 1334 | Oleic Acid | Chemical Associates |
| TWEEN 20 | Non-Ionic Surfactant | Tween 20 | Poly(Oxyethylene) Sorbitan Monolaurate | Uniqema |
| ODOR BQT #65104 | Odorant | BQT 65104 | Diethylphthalate | Intarome Fragrance |
| DARVAN 6/670 | Anionic Surfactant | Darvan 670 | Sodium Polynaphthalene Sulfonate | RT Vanderbilt |
| PARAGUM 231 (131) | Thickener | Paragum 231 | Sodium Polyacrylate | Parachem |
| TRITON N-57 | Non-Ionic Surfactant | Triton N-57 | Nonylphenol Ethoxylate | Dow |

TABLE 2-continued

Ingredients

| Ingredient Name | Purpose | Brand Name | Generic Name | Commercial Source |
|---|---|---|---|---|
| PERKACIT ZDMC PDR-D | Accelerator | ZDMC | Zinc Dimethyl Dithiocarbamate | Flexsys |
| SODIUM BENZOATE MICRONIZED | Stabilizer | Sodium Benzoate | Sodium Benzoate | Noveon |
| AMMONIUM HYDROXIDE | Neutralizing Agent | Ammonium Hydroxide | Ammonium Hydroxide | Univar |
| #344 30 MESH BENTONITE | Dispersant | #344 Bentonite | Bentonite Clay | Mineral & Pigment Solutions |
| TETRA SODIUM PYRO PHOSPHATE GRANULAR | Anionic Surfactant | TSPP | Tetrasodium Prophosphate | Solutia |
| SULFUR RM 104 G | Vulcanizer | Rubermaker's Sulfur 104G | Elemental Sulfur | Harwick |
| DARVAN WAQ | Anionic Surfactant | Darvan WAQ | Sodium Lauryl Sulfate | RT Vanderbilt |
| PROCOTE 200MV | Amphoteric Surfactant | Pro-Cote 200 | Soy Protein Polymer | DuPont |
| SODIUM HYDROXIDE (CAUSTIC SODA BEADS) | Neutralizing Agent | Caustic Soda Beads | Sodium Hydroxide | PPG |
| CALSOFT F90 | Anionic Surfactant | Calsoft F90 | Sodium Dodecylbenzene Sulfonate | Pilot Chemical |
| AGERITE STALITE LIQUID | Antioxidant | Agerite Stalite Liquid | Octylated Diphenylamine | RT Vanderbilt |
| WITCO ACID 1298 SOFT | Dispersant | Witco 1298 | n-Dodecylbenzene Sulfonic Acid | Witco Corp. |
| DARVAN 7/7N | Dispersant | Darvan 7N | Sodium Polymethacrylate | RT Vanderbilt |
| TRIETHANOLAMINE 85% | Dispersant | Triethanolamine 85% | Triethanolamine | Farley Chemical |
| DOWICIDE A | Antimicrobrial | Dowicide A | Sodium o-Phenylphenate | Dow |
| SODIUM SILICATE D (50 DEG BE) | Secondary Binder | D Sodium Silicate | Sodium Silicate | PQ Corp. |
| VANGEL B | Thickener | Van Gel B | Smectite Clay | RT Vanderbilt |

TABLE 3

| Ingredient Name | Comparative Example A | Example 1 | Example 2 |
|---|---|---|---|
| LATEX, HA NATURAL | 67.881 | 67.033 | 62.789 |
| TI-PURE R-960-07 | 14.305 | 13.647 | 16.747 |
| DE-IONIZED WATER | 13.694 | 13.279 | 14.452 |
| TRITON X-405 UNION CARBIDE | 0.000 | 2.000 | 2.000 |
| TRITON X-100 SURFACTANT | 0.022 | 0.022 | 0.020 |
| HAR #11 R CASEIN POWDER | 0.048 | 0.048 | 0.045 |
| CAUSTIC POTASH-KOH FARLEY CHEM | 0.078 | 0.076 | 0.086 |
| N-521 BIOCIDE | 0.001 | 0.001 | 0.001 |
| VANCIDE MZ-96 POWDER | 0.017 | 0.017 | 0.016 |
| GUM ARABIC G-150 POWDER | 0.058 | 0.058 | 0.054 |
| OLEIC ACID CA 1334 | 0.058 | 0.057 | 0.053 |
| TWEEN 20 | 0.007 | 0.007 | 0.007 |
| ODOR BQT #65104 | 0.073 | 0.072 | 0.068 |
| DARVAN 6/670 | 0.019 | 0.019 | 0.017 |
| PARAGUM 231 (131) | 0.003 | 0.003 | 0.003 |
| TRITON N-57 | 0.0004 | 0.0004 | 0.0003 |
| PERKACIT ZDMC PDR-D | 0.183 | 0.181 | 0.169 |
| SODIUM BENZOATE MICRONIZED | 0.0001 | 0.0001 | 0.0001 |
| AMMONIUM HYDROXIDE | 0.137 | 0.130 | 0.162 |
| #344 30 MESH BENTONITE | 0.002 | 0.002 | 0.002 |
| TETRA SODIUM PYRO PHOSPHATE GRANULAR | 0.0001 | 0.0001 | 0.0001 |
| SULFUR RM 104 G | 0.772 | 0.763 | 0.714 |
| DARVAN WAQ | 0.733 | 0.724 | 0.678 |
| PROCOTE 200MV | 0.293 | 0.289 | 0.271 |
| SODIUM HYDROXIDE (CAUSTIC SODA BEADS) | 0.010 | 0.010 | 0.010 |
| CALSOFT F90 | 0.146 | 0.145 | 0.135 |
| AGERITE STALITE LIQUID | 0.366 | 0.361 | 0.339 |
| WITCO ACID 1298 SOFT | 0.004 | 0.004 | 0.003 |
| DARVAN 7/7N | 0.347 | 0.330 | 0.415 |
| TRIETHANOLAMINE 85% | 0.004 | 0.004 | 0.004 |
| DOWICIDE A | 0.146 | 0.145 | 0.135 |
| SODIUM SILICATE D (50 DEG BE) | 0.377 | 0.372 | 0.349 |
| VANGEL B | 0.212 | 0.201 | 0.254 |
| Total | 100.00 | 100.00 | 100.00 |

TABLE 4

| | Comp. A-1 | Comp. A-2 | Comp. A-3 | Example 1a | Example 1b | Example 2 |
|---|---|---|---|---|---|---|
| Viscosity (Brookfield RVF Viscometer #3 spindle/10 RPM shear rate) cPs | 900 | 1140 | 1170 | 3580 | 3200 | 500 (#3 spindle @ 100 rpm) |
| Percent Solids (after heating at 121° C. for 25 mins.) | 66.00 | 67.51 | 67.31 | 67.60 | 67.80 | 66.00 |

TABLE 4-continued

|  | Comp. A-1 | Comp. A-2 | Comp. A-3 | Example 1a | Example 1b | Example 2 |
|---|---|---|---|---|---|---|
| pH (ASTM D-1076) | 9.07 | 9.16 | 9.12 | 9.20 | 9.27 | 8.87 |
| Shear Stability in min:sec (ASTM D-1076 using a 60 gram sample, Arrow mixer 5.5 set point (3800 rpm), and a Cowles blade agitator) | N/A | 17:18 | 18:40 | >60 | >60 | >60 |

The addition of merely 2 weight percent of the non-ionic surfactant, octyl phenol ethoxylate, caused a tripling of viscosity, but, unexpectedly, also resulted in a tripling of shear stability. Indeed, one would expect shear stability to decrease as viscosity of a latex compound increased. Stated another way, even though the viscosity increased as expected with the addition of the non-ionic stabilizer, the shear stability did not decrease or remain the same. The shear stability increased tremendously and was more than 300% longer in duration than the latex compound without the non-ionic stabilizer.

Comparative Example A was deemed unsatisfactory due to insufficient shear stability; Example 1 was considered a commercially acceptable product because of the abrupt step change increase in shear stability while remaining within the range of an acceptable, though increased, amount of viscosity. Example 2 improved on Example 1 by increasing the amount of pigment relative to the latex, while keeping constant. the weight percent of the non-ionic stabilizer, octyl phenol ethyoxylate.

The latex inks of the present invention are more environmentally benign than solvent-based inks, because they do not contain volatile organic chemicals. The latex inks perform unexpectedly well because of the addition of octyl phenol ethoxylate as a non-ionic stabilizer. Shear stability of more than 60 minutes is outstanding.

The invention is not limited to the above embodiments. The claims follow.

What is claimed is:

1. A latex marking ink, comprising:
   (a) vulcanizable rubber;
   (b) pigment;
   (c) water;
   (d) a vulcanizing agent; and
   (e) octyl phenol ethoxylate comprising an average of about 35 moles of ethoxylation and present in an amount from about 0.1 to about 5 weight percent of the ink,
   wherein shear stability of the ink is greater than three times shear stability of the ink without the octyl phenol ethoxylate as determined by ASTM D1076, and
   wherein the vulcanizable rubber is present in an amount from about 55 to about 75 weight percent of the ink, the pigment is present in an amount from about 10 to about 20 weight percent of the ink, the vulcanizing agent is present in amount ranging from about 0.2 to about 4.0 weight percent of the ink, and the water is present in an amount ranging from about 5 to about 25 weight percent of the ink.

2. The ink of claim 1, wherein the vulcanizable rubber comprises particles of rubber selected from the group consisting of natural rubber (NR), butadiene rubber (BR), chloroprene rubber (CR), acrylonitrile-butadiene rubber (NBR), isoprene rubber (IR), styrene-butadiene rubber (SBR), modified styrene-butadiene rubber, carboxy-modified styrene-butadiene rubber (c-SBR), butyl rubber (IIR), acrylonitrile-styrene-butadiene rubber (NSBR), and combinations thereof.

3. The ink of claim 1, wherein the vulcanizable rubber is high ammonia natural rubber.

4. The ink of claim 3, wherein the vulcanizing agent is selected from the group consisting of sulfur; selenium; tellurium; a compound containing one or more of sulfur, selenium, or tellurium; an aromatic nitro compound; a peroxide; and combinations thereof.

5. The ink of claim 4, wherein the pigment is selected from the group consisting of inorganic pigment or organic pigment.

6. The ink of claim 1, wherein the vulcanizable rubber is present in an amount from about 60 to about 70 weight percent of the ink, the pigment is present in an amount from about 12 to about 20 weight percent of the ink, the vulcanizing agent is present in amount ranging from about 0.4 to about 1.5 weight percent of the ink, the water is present in an amount ranging from about 10 to about 20 weight percent of the ink, and the octyl phenol ethoxylate is present an amount ranging from about 0.1 to about 4 weight percent of the ink.

7. The ink of claim 6, wherein the vulcanizable rubber is present in an amount from about 60 to about 64 weight percent of the ink, the pigment is present in an amount from about 15 to about 18 weight percent of the ink, the vulcanizing agent is present in amount ranging from about 0.5 to about 1.0 weight percent of the ink, the water is present in an amount ranging from about 13 to about 16 weight percent of the ink, and the octyl phenol ethoxylate is present an amount ranging from about 1 to about 3 weight percent of the ink.

8. The ink of claim 1, wherein the ink further comprises antimicrobials, thickeners, anionic surfactants, amphoteric surfactants, dispersants, antioxidants, neutralizing agents, odorants, or activators.

9. The ink of claim 1, wherein the vulcanizing agent is present in an amount such that, upon vulcanization of the vulcanizable rubber and evaporation of the water, the ink is capable of forming a graphic, number, letter, or other indicium on a rubber substrate.

10. The ink of claim 9, wherein the vulcanization and evaporation endure for from about 8 to about 15 minutes at a temperature of between about 150° C. and about 170° C. to evaporate the water and crosslink the vulcanizable rubber.

11. A rubber substrate having a surface upon which an ink of claim 9 is applied.

12. The rubber substrate of claim 11, wherein two or more inks having different pigments are added to the surface.

13. The rubber substrate of claim 11, wherein the substrate is in the form of a vehicle tire, a gasket, a seal, a hockey puck, a hose, a carpet backing, an industrial item of vulcanized rubber or a consumer item of vulcanized rubber.

14. The rubber substrate of claim 11, wherein the vulcanization and evaporation endure for from about 8 to about 15 minutes at a temperature of between about 150° C. and about 170° C. to evaporate the water and crosslink the vulcanizable rubber.

* * * * *